United States Patent [19]

Meister et al.

[11] Patent Number: 5,792,399
[45] Date of Patent: Aug. 11, 1998

US005792399A

[54] FORMED SHAPE MADE OF REGENERATED CELLULOSE AND PROCESS FOR ITS PRODUCTION

[75] Inventors: Frank Meister, Halle; Christoph Michels; Horst Kramer, both of Rudolstadt, all of Germany

[73] Assignee: Ostthüringische Materialprüfgesellschaft für Textil und Kunststoffe mbH, Rudolstadt, Germany

[21] Appl. No.: 817,851
[22] PCT Filed: Oct. 31, 1995
[86] PCT No.: PCT/DE95/01535
  § 371 Date: Apr. 28, 1997
  § 102(e) Date: Apr. 28, 1997
[87] PCT Pub. No.: WO96/14451
  PCT Pub. Date: May 17, 1996

[30] Foreign Application Priority Data

| Nov. 3, 1994 | [DE] | Germany | 44 39 149.8 |
| Jan. 18, 1995 | [DE] | Germany | 195 01 290.9 |
| Mar. 7, 1995 | [DE] | Germany | 195 07 990.6 |

[51] Int. Cl.$^6$ .................................................. D01F 2/02
[52] U.S. Cl. ............. 264/101; 264/187; 264/210.8; 264/211.14; 264/211.17; 106/200.1; 106/200.2; 106/200.3

[58] Field of Search .......................... 264/101, 187, 264/210.8, 211.14, 211.17; 106/200.1, 200.2, 200.3

[56] References Cited

FOREIGN PATENT DOCUMENTS

| 181249 | 5/1986 | European Pat. Off. . |
| 709721 | 7/1941 | Germany . |

OTHER PUBLICATIONS

Abstract of German Democratic Republic 274,435 (Published Dec. 20, 1989).

Abstract of Japan 52-26, 561 (Published Feb. 28, 1977).

Abstract of Japan 63-282,307 (Published Nov. 18, 1988).

*Primary Examiner*—Leo B. Tentoni
*Attorney, Agent, or Firm*—Edwin D. Schindler

[57] ABSTRACT

A molding, particularly a fiber or foil molding, of cellulose regenerated by an amino-oxide process provides that the cellulose contains 0.02 to 30% mass of a polyalkylene imine derivative. In addition to improved stabilization of the molding compound, the molding or fiber exhibits improved properties, such as an anion exchange capacity, fungistatic properties and an improved hydroblast resistance.

24 Claims, No Drawings

FORMED SHAPE MADE OF REGENERATED CELLULOSE AND PROCESS FOR ITS PRODUCTION

The invention concerns formed shapes, in particular fibers or films, made of cellulose regenerated by the amino oxide procedure, and a process for producing these formed shapes.

One knows how to produce cellulose-based forming and spinning masses by dissolving cellulose in amino oxides—preferably N-methylmorpholine N-oxide—and a nonsolvent for cellulose, preferably water. By forming into threads and/or formed shapes, orienting, and regenerating the cellulose, one obtains products with multiple applications in the textile and non-textile area (W. Berger, "*Moglichkeiten und Grenzen alternativer Celluloseauflosung und-verformung.*" [Possibilities and Limitations of Alternative Cellulose Dissolution and Forming], *Lenzinger Berichte* 74 (1994) 9, pp. 11–18).)

Furthermore one knows of attempts to change the properties of the cellulose products by admixing polymeric second components. Among the descriptions we have those of additions of aliphatic and aromatic polyamides soluble in the amino oxide and of polyacrylonitrile (B. Morgenstern, "*Polymermischungen auf Cellulosebasis-ein Weg zur Eigenschaftmodifizierung*" [Mixtures of Polymers on a Cellulose Basis: An Avenue for Modifying Properties], Conference, International Symposium, Rudolstadt, Sep. 7–8, 1994). So far, these admixtures have not led to any significant changes in the framework of properties of cellulose products.

It is furthermore known that by admixing small amounts of low-molecular-weight substances, one can achieve more or less clear-cut improvements in the stability of cellulose-based forming and spinning masses. These compounds involve those with at least four carbon atoms containing at least two conjugated double bonds and at least two hydroxyl and/or amino groups (EP 0047919, DD 229708, DE 4106029). Furthermore, it is said that nitrogen-containing substances such as urea, hydroxylamine, hydrazine; sulfur-containing substances such as sulfides, thiosulfates and thioureas; and carbon-containing reducing substances, such as aldehydes and sucrose have an analogous effect (DD 158656). Further known is the treatment of cellulose threads and/or fibers, after the forming of the cellulose-based spinning mass and regeneration of the cellulose, with bifunctional and/or polyfunctional compounds, such as dicarboxylic acids, methylol compounds and cyanide chloride, which react with the hydroxyl groups of the cellulose. The crosslinking obtained in this fashion is said to lead to a greater wet-abrasion resistance of the cellulose threads and fibers. A significant disadvantage of this direct crosslinking of the cellulose molecule consists in a clear-cut increase in brittleness, which significantly makes textile processing of the fibers more difficult or even completely impossible. Finally, it is known to also use diisocyanates for the finishing of pure cotton fabrics. However, this does not produce the properties which can be achieved with N-methylol compounds (*Textilveredelung* 20, (1985), p. 44).

The present invention addresses the task of creating a formed shape, in particular a fiber or a film, made of cellulose regenerated by the amino oxide process, which features new and advantageous properties, compared to the conventional formed shapes, made of regenerated cellulose according to the amino oxide process. Not only that: from the cellulose regenerated according to the amino oxide process, there are to be created formed shapes which have improved properties, compared to the known formed shapes made by that process. In particular, the new formed shapes are to have an anion-exchange properties and fungistatic properties. Not only that: the absorptive capacity for dyes is to be improved and expanded. It is furthermore the objective of the present invention to create formed shapes, in particular fibers and films, made of regenerated cellulose with improved wet abrasion resistance. Furthermore there are to be produced formed shapes of cellulose made according to the amino oxide process, such as fibers and films, whose cellulose undergoes less polymer degradation during the process than do the cellulose-based formed shapes made according to the conventional amino oxide process. Finally, a formed shape made of cellulose regenerated according to the amino oxide process is to be created, which shape can be produced more economically, through savings in amino oxide, in particular N-methylmorpholine N-oxide. Furthermore there also is to be created a formed shape made of regenerated cellulose which shape also features, in addition to the improved wet-abrasion resistance, a good level of brightness. Furthermore, the cellulose solution which is used for the production of the cellulose-based formed shape is to be made without the separation of significant amounts of water. Finally, the production of this solution is to require a lower use of energy.

According to the invention, this task is solved with respect to the formed shape mentioned at the outset in that the cellulose contains 0.02 to 30% by mass of a polyalkyleneimine derivative of the formula

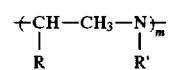

In the above, m is an integer in the range from 20 to 20,000; R is hydrogen or methyl; and R' is hydrogen or a group additionally linked to at least one nitrogen atom of another molecule of the polyalkyleneimine derivative, with the formulae

 (I)

 (II)

 (III)

 (IV)

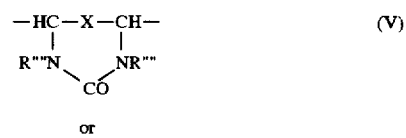 (V)

or

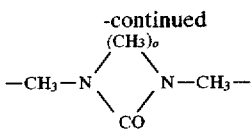

In the above, R" is an alkylene or arylene group with 2 to 13 carbon atoms; R'" is polyethylenediol (polyethoxy); R"" is hydrogen or alkyl; and X is a single bond or methylene; n an integer from 2 to 4; and Ω an integer ≧2.

Surprisingly it was found that the formed shapes according to the invention possessed new and improved properties compared to those made of regenerated cellulose by the conventional amino oxide process. The ethyleneimine chains (which are not linked to the cellulose but are structured into its network) lend the formed shape the property of a highly active anion exchanger. The exchange capacity depends on the content of ethyleneimine derivative in the cellulose, but is generally higher than that of conventional anion exchangers. For instance, the formed shape according to the invention with 10% by mass of ethyleneimine derivative, has the 6-fold exchange capacity of a conventional anion exchanger. The formed shape according to the invention has an improved absorptive capacity for dyes. Thus, for instance, acid dyes may be used which otherwise could only be used in dying natural or synthetic amide fibers. Furthermore it was found that the fibers, films, and other formed shapes according to the invention have a fungistatic effect. This effectiveness was demonstrated on the pathogenic fungi *Trichophyton mentagrophytis, Epidermophyton floccosum* and *Fusarium oxysporum*.

The crosslinked regenerated-cellulose fiber of the invention also distinguishes itself by a considerable improvement in the wet abrasion resistance. As is known, the cellulose fiber regenerated by the amino oxide process features as a result of the process a crystalline structure which tends toward a greater fibrillation when stressed in the wet condition. This is associated with a drop in wet abrasion resistance. This negative property of the "amino oxide fiber" limits the range of application of this fiber in the textile field. Surprisingly it was now found that the wet abrasion resistance is significantly improved if the regenerated cellulose made by the amino oxide process contains a polyethyleneimine crosslinked by means of a bifunctional or polyfunctional alkyleneisocyanate. Thus it was found, for instance, that the wet abrasion resistance of the regenerated cellulose made by the amino oxide process is improved by approximately a factor of 30 when the cellulose contains about 5% by mass of the ethyleneimine derivative. The preferred content of ethyleneimine derivative in the regenerated cellulose lies in the range of 0.1 to 10% by mass.

In above-mentioned crosslinking agents of Formulae (II) to (VI), the preferred meanings are as follows: for Ω, an integer from 2 to 6; R'" polyethylenediol with a degree of polymerization of 2 to 100; and R"", hydrogen or alkyl with 1 to 10 carbon atoms, in particular with 1 to 4 carbon atoms. Cellulose-based formed shapes, with the polyalkyleneimine derivative crosslinked according to the invention, show a considerable increase in the wet abrasion resistance, compared to the cellulose-based formed shapes produced in the same manner, [but] without crosslinked polyalkyleneimine. In that case the wet abrasion resistance increases—depending on the nature of the crosslinking agent used and its concentration—to, say, a value between 16-fold to 70-fold of the wet abrasion resistance of the cellulose-based formed shape without crosslinked polyalkyleneimine. The embrittlement of the cellulose-based formed shape increases because of the crosslinking; however, it remains within a tolerable range.

One obtains particularly suitable cellulose-based formed shapes, in particular fibers, if the crosslinking group R' is 1-3-dimethylenepropylene urea (above-mentioned Formula (V) with n=3); or 1-3-dimethylethylene-4,5-diyl-urea (above-mentioned Formula (IV) with X=a single bond and R""=—CH$_3$).

Processwise, the task is accomplished by a process for producing cellulose-based formed shapes, in particular fibers, filaments and films, using the dry-wet extrusion process, by making a polymer solution with 5% to 25% by mass of cellulose, 85% to 65% by mass of a tertiary amino oxide (preferably N-methylmorpholine N-oxide), and 8% to 16% by mass of a non-solvent for cellulose (preferably water); forming this polymer solution by pressing the solution through forming nozzles; stretching the jet of solution so obtained, in a non-precipitating medium, between the nozzle discharge and the infeed into a precipitating bath; precipitating the cellulose-based formed shape; [followed by] post-treatment and drying; characterized in that one uses a polymer solution having 0.02% to 30% by mass (in terms of cellulose) of polyalkyleneimine of the formula

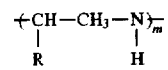

(where R means hydrogen or methyl and m means an integer between 20 and 20,000); [and in that] one precipitates out a cellulose-based formed shape containing a polyalkyleneimine.

It was found that the presence of the ethyleneimine derivative not only improves the properties of the formed shape, but also brings advantages in the production of the formed shape, by increasing the stability of the polymer solution. The presence of the polyethyleneimine greatly inhibits the degradation of the cellulose during the production, and the thermal stressing of the polymer solution which accompanies it. For instance, in the case of a one-hour tempering at 90° C., the zero-shear viscosity at 1% by mass of polyethyleneimine rises to the 6-fold of the zero-shear viscosity of the imine-free polymer solution; with 0.1% by mass of polyethyleneimine, it still rises to the 3.7-fold value. Not only that: it was found that the decomposition of the amino oxide in the polymer solution under above-mentioned thermal stress was significantly diminished by the imine content. For instance, the decomposition of N-methylmorpholine N-oxide in the polymer solution drops to about 7% with the addition of 1% by mass of ethyleneimine derivative and to 17% with an addition of 0.01% by mass of ethyleneimine derivative, compared with the decomposition of N-methylmorpholine N-oxide in a polymer solution without such an addition. In this fashion, the stabilizing effect on N-methylmorpholine N-oxide by the formed-shape component according to the invention is significantly greater than that of known stabilizers of the 4-hydroxyphenylcarboxylic acid type. Finally, it was also found that the degree to which the degradation of the cellulose polymer in forming and spinning masses was inhibited by the stabilizers of above-mentioned type was significantly greater if polyethyleneimine was added according to the invention, than it was in the case of forming masses without polyethyleneimine. Consequently, the known stabilizers of above-mentioned type may be used in the polymer solution for the preparation of formed shapes according to the invention at concentrations that are lower than in the case of forming masses which are free of polyethyleneimine. This optional addition of above-mentioned stabilizer is made in an amount in the range of 0.01 to 0.5% by mass, preferably in an amount of 0.01% to 0.1% by mass. The suitable stabilizers of above-mentioned type comprise compounds with the general formula

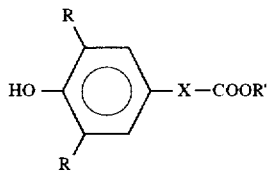 (2)

where R represents hydrogen, hydroxyl, or alkyl with 1 to 18 (preferably 1 to 5) carbon atoms; R' represents hydrogen or alkyl with 1 to 18 (preferably 1 to 5) carbon atoms; and X represents ethylene or a direct single bond.)

Even though the polyethyleneimine-chain molecule does not undergo a reactive linking with the molecules of the regenerated cellulose, its binding into the cellulose network is so strong that afterwards [the polyethyleneimine] cannot be dissolved [leached] out by, say, several hours of treatment with hot water. Consequently, the new and improved properties of the formed shape according to the invention are washproof.

According to a preferred implementation of the process according to the invention, one treats the cellulose-based formed shape containing polyalkyleneimine in the presence of water with at least one polyisocyanate of the formula $$R''{+}NCO)_n$$

in which R" is an aliphatic or aromatic group with 2 to 13 carbon atoms and n is an integer between 2 and 4. In particular, the aliphatic or aromatic group is alkylene and/or arylene and n is 2. In particular, this treatment occurs between the precipitation and the drying of the precipitated formed shape.

In another mode of implementation, the process according to the invention is characterized in that one treats the cellulose-based formed shape containing the polyalkyleneimine in the presence of water with an agent reacting with the amino groups of the polyalkyleneimine, [taken] from the group having the formulae

 (II)

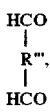 (III)

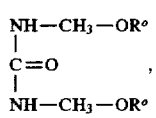 (IV)

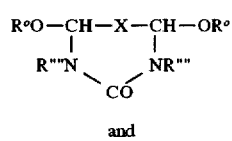 (V)

and

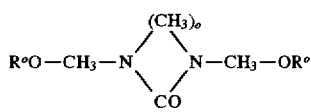 (VI)

in which Ω, R''', R'''' and X have the meanings cited in claim 1, and R° means hydrogen or methyl; and crosslinks the polyalkyleneimine by heating to a temperature in the range from 95° to 125° C. in the presence of a catalyst. The treatment and crosslinking are preferably carried out between the precipitation of the cellulose-based formed shape and the final drying. Thus, the treatment can be carried out in a finishing bath which contains the crosslinking agent and the catalyst. The treatment time can range from 0.5 minutes to 30 minutes. With the raised temperature, the preferred duration of the crosslinking lies in the range from 1 to 3 minutes.

After the preferred form of embodiment of the process according to the invention one heats the cellulose-based formed shape containing the polyalkyleneimine to a temperature ranging from 100° to 110° C. Compared to the treatment of cellulose-based OH groups with compounds containing methylol groups, the crosslinking according to the invention can be carried out at lower reaction temperatures and leads to a reduced embrittlement of the cellulose fiber.

It is practical to use as catalyst acid-acting salts of Groups and/or Subgroups 2 and/or 3 of the periodic table. Among suitable salts are magnesium sulfate, zinc sulfate, aluminum sulfate, magnesium chloride and magnesium acetate.

In a further embodiment the process according to the invention the following is provided in order to make the polymer solution:

(a) In an aqueous liquor one pretreats enzymatically the cellulose at temperatures from 20° to 70° C. at a pH between three and 10, using cellulase in an amount ranging from 0.2% to 10% by mass, relative to the cellulose;

(b) one separates the pretreated cellulose from the liquor; and (c) one introduces the separated cellulose into a liquid mix with a mol ratio of N-methylmorpholine N-oxide to water ranging from 1:<to 1.2 to 1:>0.8 and one shears [high-shear mixes] it until it is completely dissolved.

Surprisingly it was found that the dissolution of cellulose in N-methylmorpholine N-oxide monohydrate is greatly facilitated if the cellulose is pretreated with enzyme according to the invention. The pretreated cellulose can then be dissolved directly in the liquid mix of NMMNO monohydrate (which may contain a small excess of water or NMMNO) without having to use the detour via an aqueous NMMNO solution with a high water content (say, 40% water). In the case of the process according to the invention, comparatively little water must be evaporated in step (c). In this fashion—and because of the significant shortening of the dissolution time for the cellulose—one obtains a decrease in energy consumption and in the equipment expenditures for the dissolution step.

According to the preferred form of embodiment of the process according to the invention, one uses in step (c) a concentrate obtained by concentrating the spinning bath used in the spinning of the cellulose solution. One can concentrate the spinning bath (e.g., by evaporating it down—directly to the monohydrate or even further—in a multistage evaporator installation) in a significantly more energy-saving and NMMNO-protective manner than if the concentration were to be carried out, say, from 60% by mass to 87% by mass of NMMNO, during the dissolving step of the highly viscous cellulose suspension or solution. It is practical to concentrate the concentrate to at least 86.7% by mass NMMNO—i.e., at least to the monohydrate stage. It seems practical to aim for the highest possible concentration if the cellulose, as separated in step (b), still contains considerable amounts of moisture. In that case one should introduce the cellulose in as low-water a liquid mix as possible, whose mol ratio NMMNO: $H_2O$ should be 1:>1.

It is practical to effect the dissolution of the cellulose in step (c) at a temperature ranging from 72° to 95° C. The preferred temperatures range from 80° to 90° C.

It is preferred that the cellulose suspension be degassed under vacuum during the dissolution process. The small amounts of water which might have to be removed in step (c) are then drawn off quickly and in a way that protects the solvent.

The pretreatment is carried out preferably with a cellulase content in the liquor ranging from 0.5% by mass to 3.0% by mass. The preferred pretreatment temperature ranges from 30° to 60° C. Generally, the pretreatment is carried out with a cellulose/water liquor ratio in the range from 1:3 to 1:30. The pH lies preferably in the range from 4.5 to 8. The separation of the enzyme-pretreated cellulose from the liquor may be carried out, say, by pressing or centrifugation.

In order to raise the effectiveness of the enzyme pretreatment one can, prior to the latter, beat the cellulose in water using shearing. In this preliminary step the cellulase can either be included in the liquor or it is only added after the liquor has been beaten. This preliminary step facilitates the enzymatic activation of the cellulose and shortens the duration of the enzyme pretreatment. The duration of the enzyme pretreatment lies preferably in the range from 0.2 hours to 3 hours, in particular in the range from 0.75 hours to 2.0 hours. The enzyme to be used can be a commercial grade of cellulase such as Rucolase from the firm Rudolph Chemie or Roglyr 1538 from the firm Rotta GmbH.

It is practical to return back to step (a) the liquor separated in step (b), after having made up the enzyme used up; this minimizes the expense with enzyme. The cellulose largely separated from the liquor is continuously or discontinuously introduced into the liquid mix of NMMNO and water. The homogeneous solution so obtained can be used directly for spinning into threads.

Below, the invention will be explained by examples and comparative examples. In order to judge the stabilizing effect of the polyethyleneimine on the polymer degradation and on the amino oxide decomposition one uses the determination of zero-shear viscosity, by recording the flow curve and estimating it by the Carreau method; and/or one determines the steam-volatile bases in the tempered polymer solution.

1. DETERMINATION OF ZERO-SHEAR VISCOSITY

In a rotational viscometer with a cone and plate system one places 2.5 g of polymer solution. At a mass temperature of 95° C. one measures the shearing stress as a function of the shearing velocity, in the range from 0.01 to 1.5 l/s. The flow curve is estimated automatically in accordance with equation (1):

$$\eta_0 = \eta_1 (1+\gamma)^c \quad (1)$$

2. DETERMINATION OF STEAM-VOLATILE BASES

Using steam distillation, the volatile bases produced by the decomposition of the amino oxide are distilled off from a mixture of 20 to 100 g polymer solution and 100 g water; the distillate is trapped in 0.1 n sulfuric acid and is determined by conductometric back titration using 0.05 n sodium hydroxide. The calculation is made as N-methylmorpholine.

PRODUCTION OF FORMING AND SPINNING MASS

Embodiment 1

In a kneader one places 600 g of aqueous 65% N-methylmorpholine N-oxide solution (NMMNO) containing 5 g polyethyleneimine (PEI) with a mol mass of about 50.000 and adds 45 g of enzyme-pretreated cellulose (pine pulp, Cuoxam-DP 590). Using a temperature of 85° C. and a vacuum of 20 mbar, 150 g of water are distilled off during 30 minutes. This produces a light yellow solution free of fiber residues, with a refractive index of 1.4830 at 50° C. The polymer solution consists of 9% cellulose, 1% PEI and 90% NMMNO monohydrate and can be used directly for spinning purposes.

Embodiments 2a to 2d

The method of Embodiment 1 was followed, but the polymer solution contained 2.5 g, 0.5 g, 0.1 g and/or 0.05 g PEI.

Embodiment 3

The method of Embodiment 1 was followed, but in the polymer solution there were contained, instead of the 5 g PEI, only 0.1 g PEI plus 0.1 g of 3-(3,5 tert-butyl-4-hydroxphenyl)propionic acid.

Embodiment 4

The method followed was that of Embodiment 1, but in the polymer solution there were contained, instead of the 5 g PEI, only 0.1 g PEI plus 0.05 g gallic acid propyl ester.

Embodiments 5 to 7

In Embodiment 5, the method followed was that of Embodiment 1, however without the addition of PEI. In the Embodiments 6 and 7, there was no addition of PEI, but there was the addition of, respectively, 0.1 g of 3-(-3,5-tert-butyl-4-hydroxphenyl)propionic acid and 0.05 g of gallic acid propyl ester.

The polymer solutions according to Embodiments 1 to 7 were aged for one hour at 90° C. Next, the zero-shear viscosity and the content of volatile bases were determined. The results are shown in Table 1.

TABLE 1

| Embodiments | PEI, %[1] | Cpd. of Formula 2, %[1] | $\eta_0$ Pa x s | Volatile bases, %[2] |
|---|---|---|---|---|
| 1 | 1.0 | — | 4210 | 0.08 |
| 2a | 0.5 | — | 3880 | 0.09 |
| 2b | 0.1 | — | 2550 | 0.10 |
| 2c | 0.02 | — | 2100 | 0.13 |
| 2d | 0.01 | — | 1640 | 0.20 |
| 3 | 0.02 | 0.02 | 3090 | 0.11 |
| 4 | 0.02 | 0.01 | 4680 | 0.06 |
| 5 | — | — | 680[3] | 1.17 |
| 6 | — | 0.02 | 1980 | 0.64 |
| 7 | — | 0.01 | 2620 | 0.46 |

[1] Referred to the Forming and Spinning Mass
[2] Referred to entire NMMNO portion
[3] Cuoxam-DP 405

EXAMPLE 1

The polymer solution of Embodiment 2a is fed via a spinning pump to a spinneret (D=70 um; L/D=1) with 1200 capillaries and is formed into threads; it is stretched in a 1:2.9 ratio in the air gap; the cellulose is precipitated in an aqueous NMMNO solution; and the NMMNO is washed off. The threads run for 2 minutes through a bath with an aqueous liquor containing 1% of the adduct of hexamethylene diisocyanate and potassium hydrogen sulfide. Next, the threads are washed, bleached, prepared, cut into staples and dried.

EXAMPLE 2

The method followed is that of Example 1, but the polymer solution used is that of Embodiment 4.

Comparative Example 1

The method used is that of Example 1, but the polymer solution used is that of Embodiment 7.

The textile mechanical parameters of the fibers obtained according to Examples 1 and 2 and Comparative Example 1 were determined. In addition, the wet abrasion resistance was determined according to the method of K. P. Mieck et al. (cf. *Lenzinger Berichte*, 74 (1994) 9, pp. 61–68). The data determined are shown in Table 2.

TABLE 2

| Parameter | Example 1 | Example 2 | Compar. Example 1 |
|---|---|---|---|
| PEI content, % | 5.3 | 0.22 | — |
| Fineness, dtex | 1.70 | 1.72 | 1.70 |
| Tear resistance, cN/tex | 45.2 | 44.7 | 42.8 |
| Elongation at tear, % | 11 | 11 | 12 |
| Loop efficiency, cN/tex | 8.4 | 10.6 | 17.2 |
| Wet abrasion res., revs. | 3,550 | 570 | 12 |

EXAMPLE 3

According to Example 1, without post-treatment with the hexamethylene diisocyanate/potassium hydrogen sulfide adduct, a polymer solution in accordance with Embodiment 1 is spun into cellulose fibers with a fineness of 1.7 dtex; it is then cut into a staple 30 mm long and dried to a final moisture of about 80%. Per kg, the dried fiber contains 2.3 mol in exchange-active groups and a calculated surface of about 220 m². In order to purify an amount of waste water loaded with dye, 10 g of fibers were placed in a G1 frit [fritted-glass filter] and the wastewater was passed through at a velocity of 12 cm/min. After 9.2 liters of wastewater had flowed through, one could note a slight coloration of the eluate. The fiber was exhausted.

Comparative Example 2

An amount of 10 g of a resin containing 0.9 mol of active —N(CH$_3$)$_2$ groups per kg are filled into the G1 frit [fritted-glass filter]. The wastewater used in Example 3 is passed through at the same velocity. With an average grain diameter of 1 mm and approximately equal density, the calculated surface of the resin amounts to only about 4 m². After 1.5 liters have flowed through, the eluate is slightly colored; the resin is exhausted. The ratio of capacities with respect to the fibers in Example 3 is about 1:6.

EXAMPLE 4

A polymer solution according to Embodiment 2b was spun according to Example 1 and its fungistatic effect was examined. This examination was carried out in Petri dishes containing Sabourand-2% glucose-agar (Merck) as nutrient medium. A defined amount of disinfected fibers was placed in round plates with a diameter of 25 mm and inoculated with spore suspensions of 10$^6$ of, respectively, *Trichophyton mentagrophytis*, *Epidermophyton floccosum* and *Fusarium oxysporum* per ml of physiological salt solution; they were then incubated in an incubator at 28±1° C. and 96 to 97% relative humidity. The growth of mycelia was judged visually according to a scale of grades 1 to 3, after, respectively, 1, 3, 7 and 14 days. The results are shown in Table 3.

Comparative Example 3

The method followed was the same as in Example 4, but the fiber used was one spun according to Comparative Example 1. Once again, the results are shown in Table 3.

TABLE 3

| Duration of incubation | Comparative Example 3 | | | Example 4 | | |
|---|---|---|---|---|---|---|
| Days | TM | EF | FO | TM | EF | FO |
| 1 | 2 | 0 | 1 | 0 | 0 | 0 |
| 3 | 2–3 | 2–3 | 3 | 0 | 0 | 0 |
| 7 | 3 | 3 | 3 | 0 | 0 | 0 |
| 14 | 3 | 3 | 3 | 1 | 0 | 2 |

0 = no growth; 1 = thin mycelium; 2 = thin, downy mycelium or single colonies; 3 = dense downy mycelium or numerous colonies.

EXAMPLE 5

In a heatable mixing container one meters in continuously N-methylmorpholine N-oxide-monohydrate (NMMNO-MH) containing 0.163% polyethyleneimine (mol mass 50,000), plus enzyme-activated cellulose (eucalyptus pulp, Cuoxam-DP 540) with a water content of 50%, in a 3.1:1 ratio; they are then mixed and aged at 85° C. Via a slurry pump the mixture is conveyed continuously into an extruder with vacuum degassing. After the evaporation of 12.2% water and total degassing one obtains a homogeneous light-yellow spinning solution with the composition 13.86% cellulose, 0.14% polyethyleneimine, 76.6% NMMNO, and 9.4% water, with a refractive index of 1.4866 at 50° C.

The polymer solution is passed through a filter with a volumetric flow rate of 116 ml/min. It is then conveyed by a spinning pump to a spinneret with 1200 capillaries (D=60 um, L/D=1), formed into threads, stretched in an airgap 6 mm wide in a 1:2.9 ratio, and precipitated in an aqueous NMMNO solution as a cellulose/PEI mixture. The multifilament thread is enveloped and conveyed by a spinning funnel, stretched at 70 m/min via a godet roll and washed to remove the NMMNO.

The thread is cut into staples. The fibers are bleached; treated in a bath containing 10 g/l glyoxal, 1 g/l magnesium sulfate and avivage during 2 minutes; pressed out and, at 100° to 110° C., dried and crosslinked. The fibers have a fineness of 1.7 dtex. The wet abrasion resistance and the loop breakage force are shown in the Table. The wet abrasion resistance was determined according to the method of K. P. Mieck et al. (cf. *Lenzinger Berichte* 74 (1994) (9), pp. 61–68. The loop breakage force is used to measure the embrittlement and should not be less than 6 cN/tex.

EXAMPLES 6 to 10

The method used was analogous to that in Example 5, however other crosslinking agents and other crosslinking-agent concentrations were used. There also were changes in the catalyst and in the catalyst concentration. once again, the respective values are shown in Table 4.

Comparative Example 4

The method used was the same as in Example 5. However, the avivage bath did not contain a crosslinking agent. The fiber properties are once again shown in Table 4.

TABLE 4

| Example | Crosslinking Agent | Conc., g/l | Catalyst | Conc., g/l | Wet Abrasn. Resistance | Loop tear res. |
|---|---|---|---|---|---|---|
| 5 | Glyoxal | 10 | MgSO$_4$ | 1.0 | 380 | 9.8 |
| 6 | Glyoxal | 6 | MgSO$_4$ | 0.5 | 220 | 10.4 |
| 7 | Dimethylol urea | 35 | MgCl$_2$ | 8.5 | 750 | 7.2 |
| 8 | 1,3-Dimethyl-4,5-dihydroxyethylene urea | 40 | MgCl$_2$ | 9.0 | 980 | 6.1 |
| 9 | 1,3-Dimethoxy-propylene urea | 15 | MG-acetate | 2.5 | 630 | 6.9 |
| 10 | Polyethylenediaceta 1 (mol mass approx. 400) | 20 | MgCl$_3$ | 1.0 | 410 | 11.2 |
| VB 4 | — | | — | | 14 | 14.2 |

Enzymatic Pretreatment of Cellulose and Formation of Cellulose Solution

Embodiments 8 to 13

An amount of 5 kg of pine sulfite sheet pulp (alpha-cellulose content 96.5%, Cuoxam-DP 630 and/or 431) are beaten in a heatable turbo-solubilizer [pulp disintegrator] in water, in a liquor ratio of 1:5 to 1:20. Next, it is heated to a temperature between 30° and 60° C., the pH adjusted to values between 4.5 and 8, by admixing dilute sulfuric acid or caustic soda; and treated with enzyme (0.5 to 3% by mass, relative to the alpha-cellulose) for a duration 0.75 to 2 hours. The conditions of treatment for the individual examples are shown in the table. The enzyme-containing liquor is largely separated from the cellulose (water content $\leq 50\%$) by centrifugation or pressing. After makeup of lost water and enzyme, the liquor can be reused in the turbo-stabilizer.

| Em-bodi-ment | DP, be-fore | Enzyme | % enzyme | Liquor ratio | pH | °C. | Min. | DP, after |
|---|---|---|---|---|---|---|---|---|
| 8 | 632 | Rucolase[1] | 3 | 1:20 | 4.5 | 52 | 60 | 612 |
| 9 | 632 | Roglyr 1538[2] | 1 | 1:5 | 5.0 | 55 | 45 | 609 |
| 10 | 632 | SP 424[3] | 3 | 1:10 | 5.0 | 30 | 120 | 605 |
| 11 | 430 | SP 424 | 2 | 1:10 | 5.0 | 55 | 60 | 385 |
| 12 | 430 | SP 640 | 0.5 | 1:15 | 8.0 | 60 | 90 | 402 |
| 13 | 430 | SP 431 | 2.5 | 1:20 | 6.0 | 55 | 60 | 390 |

[1]Product of the firm Rudolph Chemie
[2]Product of the firm Rotta GmbH
[3]Experimental product of the firm Novo Nordisk The table shows that the degradation of the Degree of Polymerization is comparatively low under the conditions of the enzyme pretreatment.

Embodiment 14

In laboratory kneader with a discharge screw one places 888 g of NMMNO-hydrate liquid mix at 85° C. (mol ratio NMMNO: H$_2$O=1:0.9; refractive index at 50° C., n=1.4788) To the above one adds 167 g of the cellulose obtained in accordance with Embodiment 8 (water content: 40%). After mixing for 5 minutes under vacuum at 20 mbar one obtains 1 kg of a homogeneous, yellow polymer solution, free of air bubbles, containing 10% cellulose and 90% NMMNO monohydrate, with a refractive index at 50° C. of 1.4810.

The cellulose obtained in Embodiments 9 to 13 can be transformed into homogenous polymer solutions in an analogous manner and in similarly short time periods.

Embodiment 15

Cellulose pretreated as in Embodiment 10 (water content: 37.5%) is conveyed continuously at a rate of 40 g/min via a scale to a twin-screw extruder (DSE) with a screw diameter of 25 mm. Using a conveyer pump, one meters 219 g/min of amino-oxide liquid mix (mol ratio NMMNO: H$_2$O=1:0.9) into the first region of the DSE, which is heated throughout to 85° C. After the two components are mixed the mixture reaches the degassing region, where it is degassed under a vacuum of 15 to 20 mBar and the excess water is removed at the rate of 9 g/min. After an average dwell time of 5 minutes, 250 g/min of homogenous polymer solution (refractive index n=1.4794 at 50° C.) continuously leave the DSE. The solution consists of 10% cellulose and 90% of NMMNO hydrate (mol ratio NMMNO: H$_2$O 1:1.1).

Embodiment 16

In a manner analogous to Embodiment 15, 48 g/min of cellulose pretreated according to Embodiment 13 (water content: 37.5%) are conveyed to the DSE, mixed with 216 g/min of amino oxide liquid mix (mol ratio NMMNO:H$_2$O= 1:0.9) and are degassed and simultaneously dewatered at the rate of 14 g/min. From the extruder one stretches continuously 250 g/min of homogenous polymer solution (refractive index n=1.4813 at 50° C.), with a composition of 12% cellulose and 88% amino oxide hydrate (mol ratio: NMMNO:H$_2$O=1:1.05).

Embodiment 17

As in Embodiment 14, one places into a laboratory kneader with a discharge screw 888 g of amino-oxide-hydrate liquid mix at 85° C. (mol ratio NMMNO: H$_2$O= 1:0.9; refractive index at 50° C. n=1.4788). Instead of the pretreated cellulose one introduces 167 g of pine sulfate sheet pulp (alpha-cellulose content: 96.5%, Cuoxam-DP 630) which has been previously beaten in water in a heatable turbo-solubilizer, at a liquor ratio of 1:15; it was then dewatered to a water content of 40%. The mixture was stirred under vacuum at 20 mbar. It featured the following appearance:

1 hour: A significant proportion was swelling;

6 hours: A significant proportion had dissolved;

12 hours: Individual undissolved fiber remnants.

Embodiment 18

The method used was the same as in Embodiment 17; however, the pulp was not beaten but instead was subjected to an ultrafine grinding in a Condux mill and was added in dry condition to the NMMNO-monohydrate liquid mix. The appearance of the mixture during stirring under vacuum at 20 mBar was as follows:

1 hour: A small proportion was swelling;

6 hours: A significant proportion was swollen, a small proportion had dissolved;

12 hours: A considerable proportion was still undissolved.

We claim:

1. Formed shape of cellulose regenerated according to the amino oxide process, characterized in that the cellulose contains 0.02% to 30% by mass of a polyalkyleneimine derivative of the formula

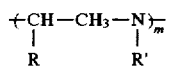

in which m is an integer in the range from 20 to 20,000; R is hydrogen or methyl and R' is hydrogen or a group which is also linked to at least one nitrogen atom of another molecule of the polyalkyleneimine derivative wherein R' is of the formulae

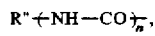 (I)

 (II)

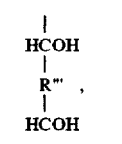 (III)

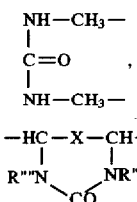 (IV)

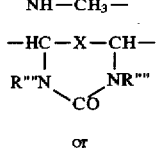 (V)

or

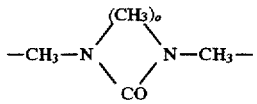 (VI)

in which R" is an alkylene or arylene group with 2 to 13 carbon atoms; R''' is polyethylenediol, R'''' is hydrogen or alkyl; and X is a single bond or methylene; a is an integer from 2 to 4 and Ω is an integer ≧2.

2. Formed shape according to claim 1, characterized in that the cellulose contains 0.1 to 10% by mass of the polyalkyleneimine derivative.

3. Formed shape according to claim 1, characterized in that R' is the group

—CO—NH—(CH$_2$)$_6$—NH—CO—.

4. Formed shape according to claim 3, characterized in that m is an integer in the range from 200 to 5,000.

5. Formed shape according to claim 1, characterized in that R' is the group

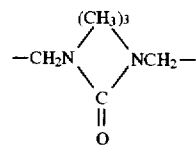

6. Formed shape according to claim 1, characterized in that R' is the group

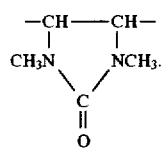

7. Process for the preparation of cellulose-based formed shapes, according to the dry/wet extrusion process, by preparing a polymer solution with 5% to 25% by mass of cellulose; 85% to 65% by mass of a tertiary amino oxide; and 8% to 16% by mass of a non-solvent for cellulose; forming this polymer solution by pressing the solution through forming nozzles, stretching the jet of solution so obtained in a non-precipitating medium, between the nozzle exit and the entry into a precipitating bath; precipitation of the cellulose-based formed shape, post-treatment and drying, characterized in that one uses a polymer solution with 0.02 to 30% by mass (in terms of cellulose) of polyalkyleneimine of the formula

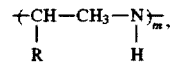 (I)

in which R is hydrogen or methyl and m is an integer in the range from 20 to 20,000; and one precipitates out a cellulose-based formed shape containing polyalkyleneimine.

8. Process according to claim 7, characterized in that one treats the cellulose-based formed shape containing polyalkyleneimine in the presence of water with at least one polyisocyanate of the formula

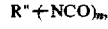 (II)

in which R" is an aliphatic or aromatic group with 2 to 13 carbon atoms and n is an integer between 2 and 4.

9. Process according to claim 7, characterized in that one treats the cellulose-based formed shape containing polyalkyleneimine in the presence of water with an agent reacting with the amino groups of the polyalkyleneimines, said agent having a formula selected from the group consisting of:

 (II)

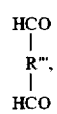 (III)

-continued

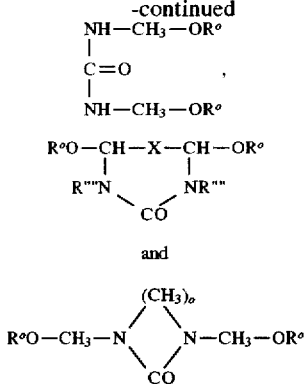

wherein, o is an integer $\geq 2$;

R'" is polyethylenediol;

R"" is hydrogen or an alkyl group;

X is a single bond or a methylene; and,

R° is hydrogen or a methyl group, and crosslinks the polyalkyleneimine by heating in the presence of a catalyst to a temperature in the range of 95° to 125° C.

10. Process according to claim 9, characterized in that one heats the cellulose-based formed shape containing polyalkyleneimine to a temperature in the range of 100° to 110° C.

11. Process according to claim 9, characterized in that one carries out the crosslinking in the presence of a magnesium salt as a catalyst.

12. Process according to claim 7, characterized in that in order to produce the polymer solution one
a) pretreats the cellulose with enzyme at temperatures between 20° and 70° C. and a pH between 3 and 10 using cellulase in an amount ranging from 0.1% to 10% by mass relative to the cellulose, in an aqueous liquor;
b) separates the pretreated cellulose from the liquor; and
c) places the separated cellulose into a liquid mix with a mol ratio of N-methylmorpholine N-oxide to water ranging from 1:$\leq$1.2 to 1:>0.8, and shears it until it is completely dissolved.

13. Process according to claim 12, characterized in that in step (c) one uses a concentrate obtained by concentrating the spinning bath that resulted from the spinning of the cellulose solution.

14. Process according to claim 13, characterized in that the concentrate is concentrated to at least 86.7% by mass of N-methylmorpholine N-oxide.

15. Process according to claim 12, characterized in that step (c) is carried out at a temperature in the range from 72° to 95° C.

16. Process according to claim 12, characterized in that during the dissolution process one degasses the cellulose suspension under vacuum.

17. Process according to claim 12, characterized in that one carries out the pretreatment using a cellulase content in the range of 0.5% to 3.0% by mass.

18. Process according to claim 12, characterized in that one carries out the pretreatment at a temperature in the range from 30° to 60° C.

19. Process according to claim 12, characterized in that one carries out the pretreatment using a liquor ratio of cellulose/water ranging from 1:3 to 1:30.

20. Process according to claim 12, characterized in that one carries out the pretreatment at a pH in the range from 4.5 to 8.

21. Process according to claim 12, characterized in that before the enzyme pretreatment one beats the cellulose in water using shearing.

22. Process according to claim 12, characterized in that one returns to step (a) the liquor separated in step (b), after having made up the enzyme consumed.

23. Process according to claim 7, characterized in that said tertiary amino oxide is N-methylmorpholine N-oxide.

24. Process according to claim 7, characterized in that said non-solvent for cellulose is water.

* * * * *